United States Patent
Smith et al.

[15] 3,706,222
[45] Dec. 19, 1972

[54] AQUATIC TORSION-FATIGUE TEST APPARATUS

[72] Inventors: Sydney Smith, Akron; Jerry Donald Hunt, Cuyahoga Falls; Richard Brotherton Esler, Clinton, all of Ohio

[73] Assignee: The Firestone Tire & Rubber Company, Akron, Ohio

[22] Filed: March 24, 1971

[21] Appl. No.: 127,692

[52] U.S. Cl. .................................73/91, 73/100
[51] Int. Cl. .......................................G01n 3/32
[58] Field of Search............73/100, 99, 159, 91, 15.6

[56] References Cited

UNITED STATES PATENTS

| 3,427,873 | 2/1969 | Mehdizadeh | 73/91 |
| 2,356,894 | 8/1944 | Sims | 73/99 X |
| 2,579,424 | 12/1951 | Gehman | 73/99 X |
| 3,491,586 | 1/1970 | Branger | 73/91 |
| 3,610,031 | 10/1971 | Clark et al. | 73/99 X |
| 2,709,359 | 5/1955 | Koch et al. | 73/91 X |
| 3,587,302 | 6/1971 | Ta-Chuan Wu | 73/100 |
| 2,844,958 | 7/1958 | Bennett et al. | 73/99 X |

*Primary Examiner*—Jerry W. Myracle
*Attorney*—S. M. Clark and Olaf Nielsen

[57] ABSTRACT

The apparatus described herein involves equipment for testing rubber-coated fabrics under stress, twisting and flexing in fluid media corresponding to those to which the material might be subjected while undergoing similar physical abuse in actual use. The test equipment is designed specifically to correlate with field conditions.

1 Claim, 6 Drawing Figures

PATENTED DEC 19 1972 3,706,222
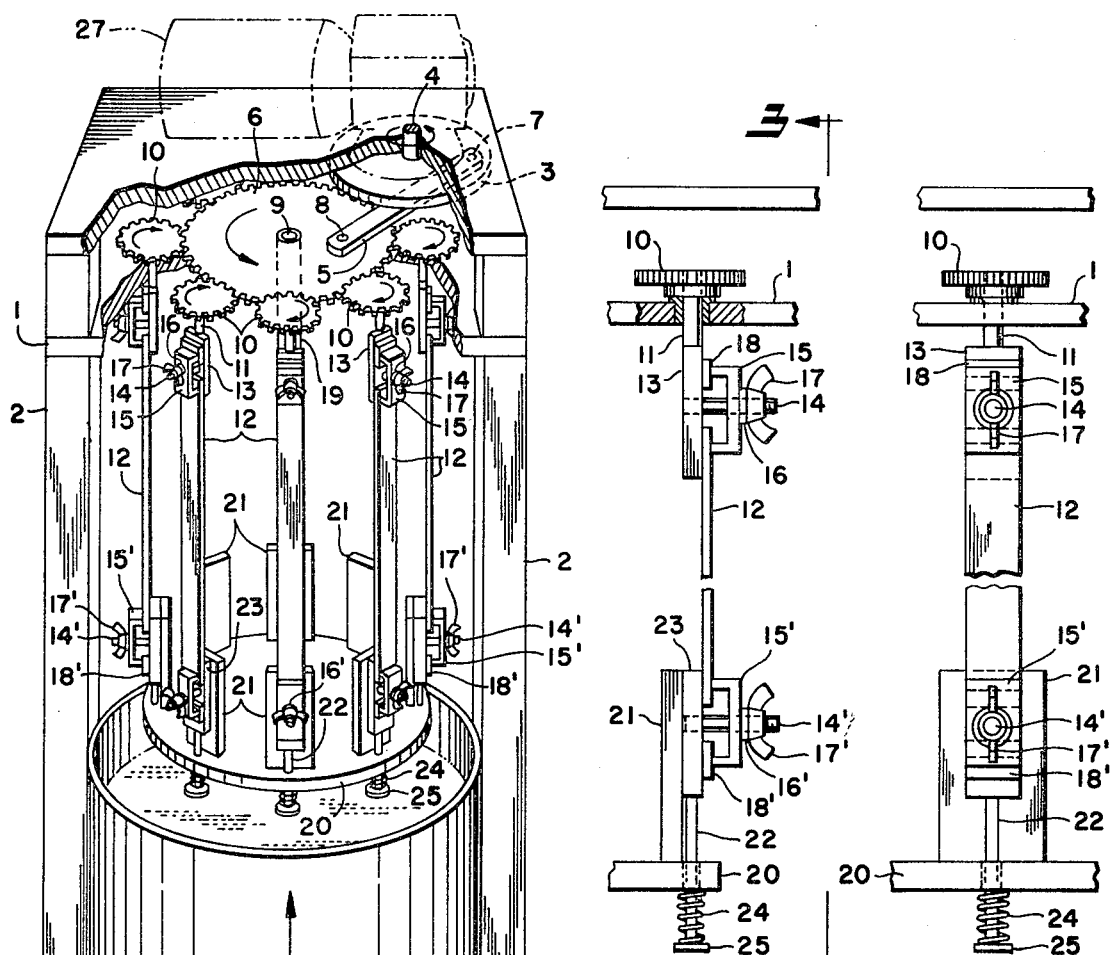
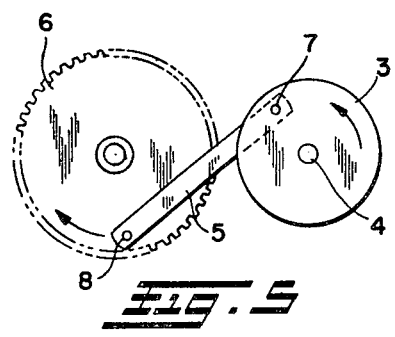
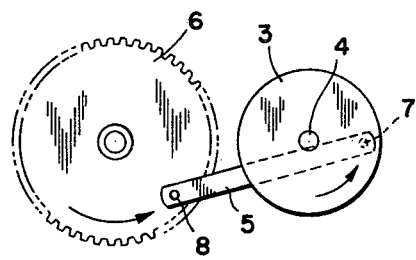
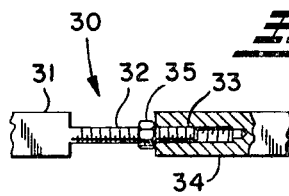
INVENTORS
SYDNEY SMITH
JERRY D. HUNT
RICHARD B. ESLER

AQUATIC TORSION-FATIGUE TEST APPARATUS

BACKGROUND OF THE INVENTION

1. Field of the Invention

This invention relates to apparatus for testing rubber-coated fabrics under conditions which simulate field conditions while immersed in a fluid medium corresponding to that with which the material will be in contact during actual use.

2. Related Prior Art

Water-control gates and dams have been developed which comprise a rubber-coated fabric tube installed across a river or on the spillway of a concrete dam. This tube is capable of being inflated with air and, if desired, partially filled with water; it may be deflated, fully or partially, for example, during storms or rainy seasons to allow passage of flood crests and to prevent upstream flooding. These are known as Fabridams and are also used to impound water upstream for a variety of purposes such as conservation, recreation, irrigation, navigation locks and hydroelectric power head maximization. Numerous installations attest to the practicality of such dams.

Since these dams may have a height of 7 feet or more and a length of 250 feet or more, a substantial amount of the rubber-coated fabric is involved in each dam. Therefore it is not practical to have to rely on the actual use to determine optimum properties of the material, and it is desirable instead to evaluate small samples of the material having various modifications in composition and processing techniques so as to evaluate and select those having the optimum in service properties and service life.

The Fabridam material is generally constructed of high-strength nylon fabric coated with durable neoprene synthetic rubber. However other combinations can be used, and it is desirable to have a testing device which can evaluate these materials in correlation with the conditions which they will meet in actual service.

In addition to the stress and strain to which the fabric is exposed due to the interior pressure required to maintain the tube in an expanded state, it must be able to withstand the impact and abrasion of heavy articles such as logs, trees and water-craft, as well as various types of debris that may float over or against the dam.

In view of the newness of this type of inflated dam, no devices have been found which are designed to test fabrics for this type of field service and the accompanying types of wear to which they will be subjected.

Since various types of failure appear in actual use where the fabric tube is subject to tugging and pulling, to jars and jabs from various types floating articles and debris, to sun and extremes in temperature, to various types of liquids or polluted air and industrial gases, it is desirable that testing equipment should be available to subject the fabric to various conditions in accelerated tests. In this way the types of failure and defects can be more quickly determined and remedied by modifications in the selection of fabric and rubbery compounds.

SUMMARY OF THE INVENTION

In accordance with the present invention, the apparatus described herein has been found to be useful in evaluating various types of fabric and various types of rubber coatings, in evaluating the various properties of rubber-coated fabric, in order to correlate these properties with those required in withstanding the physical abuse such fabrics must undergo in field service.

This apparatus is supported in a manner such that a liquid container may be raised to submerge or partially submerge the samples being tested. Alternatively, the equipment may be lowered into the fluid container. Thus the tests can be conducted while the samples are immersed in the type of fluid to which this material will be exposed in the field, and twisted repeatedly to subject them to stress and strain similar to the type that might be expected in actual use. Advantageously, the container is made of a transparent material such as glass or clear plastic, so that visual observation may be made while the samples are being tested.

In the drawings,

FIG. 1 is a perspective view of a preferred form of the equipment of the invention with the fluid container in a position lowered away from the testing apparatus, the particular form being designed to test eight samples simultaneously.

FIG. 2 shows a side elevational view of one of the individual testing units of FIG. 1.

FIG. 3 shows a front elevational view of the individual testing unit of FIG. 2.

FIGS. 4 and 5 show the drive disc, by operation of which the various individual testing units are rotated through the degrees of twist to which the sample is to be subjected, in different positions of rotation.

FIG. 6 shows, broken away and in section, a modified form of the driving rod.

In the preferred form of the apparatus of this invention, one or more long, narrow samples of the rubber coated fabric or sheet to be tested is clamped at each end and at least one of the clamping devices is adapted to be oscillated in a manner that will impart to the sample a twisting of the sample about its longitudinal axis.

In another modification, not shown in the drawings, the driving force from the main cog wheel at the top of the apparatus can also be transmitted by means of an axle rod, to rotate and drive a number of smaller cog wheels at the bottom of the equipment. These smaller cog wheels appropriately driven at the lower portion of the equipment can be used to impart a reverse twist to the clamp holding the test sample piece at its lower extremity, thereby applying a twist in one direction by the clamp holding the upper end of the sample piece, and applying a twist in the reverse direction by the clamp holding the test piece in its lower extremity.

In still another modification (also not shown), it is possible to have the twist applied only at the lower extremity by having an oscillating disc at the top of the apparatus transmit the oscillating motion down through an axle rod, which oscillating rod transmits its motion to a main cog wheel at the lower extremity, which in turn drives the various cog wheels of the individual twisting units.

The apparatus of this invention is best described by reference to the drawings. In FIG. 1, main support plate 1 is in turn supported by the four legs 2; driving disc 3 is supported by and rotated by shaft 4, which in turn is driven by a motor 27 supported above; driving rod 5 is attached to the underside of driving disc 3 at one end by pin 7 and at the other end is engaged with the top of cog wheel 6 by pin 8 in such a manner that the driving rod is free to move with the respective discs with which it is engaged.

The length of driving rod 5 and the spacing of the openings through which pins 7 and 8 are engaged are such that as driving disc 3 is rotated continuously in one direction, the cog wheel 6 is oscillated first in one direction and then in the reverse direction through the desired number of degrees which can be predetermined by the positioning of pin 8 which engages one end of driving rod 5. Cog wheel 6 is thus rotated about pin 9 which is affixed to the main supporting plate 1. Cog wheel 6 engages and rotates the individual cog wheels 10.

The degree of rotation of cog wheels 10 is determined by the relative sizes of cog wheels 6 and 10 and the degree of rotation to which cog wheel 6 is oscillated by its connection with driving disc 3. By selection of appropriate dimensions and degrees of rotation of cog wheel 6, it is possible to rotate cog wheels 10 to less than one complete revolution, or to a number of revolutions which in turn will impart to the test sample anywhere from less than one complete twist to a plurality of complete twists. If desired the sample may be given a half twist, a full twist or more before the second end of the sample is clamped into the equipment.

Each cog wheel 10 is supported on the main support plate 1 and has rigidly attached to it an axle 11 which passes through an opening in the main support plate 1 and passes downward with the lower extension thereof having attached thereto a clamping device by which test sample 12 is affixed. The lower extension of axle 11 is a flat plate 13 to which threaded rod 14 is perpendicularly affixed. This threaded rod is passed through clamp 15 on which pressure is exerted by washer 16 as wing nut 17 is appropriately rotated. Plate or shim 18 may be a metal plate of appropriate thickness or may be a small piece of the test sample so that the two ends of clamp 15 are equalized in distance from flat plate 13 against which the sample is being squeezed by clamp 15.

Supporting tube 19 is affixed at its upper extremity to the main support plate 1 and has affixed to its lower extremity supporting disc 20 which in turn has a number of vertical guide plates 21 attached thereto. Each rod 22 passes through an opening in the supporting disc 20 and at its upper extremity carries clamp plate 23. Rod 22 is free to move vertically through the opening in plate 20 and plate 23 is thus free to adjust itself vertically in relation to guide plate 21. Guide plate 21 serves to prevent clamp plate 23 from turning horizontally as test sample 12 is twisted from above. Threaded rod 14' is fastened to clamp plate 23 and passes through clamp 15'. Pressure is exerted on clamp 15' by washer 16' when wing nut 17' is turned appropriately. A shim 18' is placed under one end of clamp 15'.

Spiral spring 24 exerts pressure against head 25 so as to bias rod 22 downwardly and thereby apply a tension on the fabric sample 12. While the sample 12 is being attached under clamp 15', head 25 is pressed upward against spring 24 and held at a fixed distance above plate 20, as by means of a spacing block not shown. After the clamp has been tightened sufficiently, head 25 is released and the spring exerts pressure downward to move rod 22 and plate 23 downward and thus place the fabric sample 12 under tension.

After all the samples have been clamped as described above, container 26 is raised and supported in its raised position (supporting means not shown) so that the top of the container touches or is close to main support plate 1. Liquid in the container, added before or after the raising of the container, is at a level such that the test samples are immersed completely, or to the degree desired. As previously stated, the container is preferably made of transparent material so that the operation of the tests may be observed visually.

FIGS. 4 and 5 show the relative positions of the linked driving disc 3 and cog wheel 6, the driving disc rotating clockwise while the cog wheel oscillates through an arc. Thus, in FIG. 4, pin 7 of driving disc 3 is in 0° position; in FIG. 5, pin 7 has rotated counterclockwise to reach approximately the 120°-position, but pin 8 meanwhile has reached its maximum counterclockwise position, has reversed and has started in the clockwise direction.

In FIG. 6 is shown a modified driving rod 30, one section 31 of which is provided with an externally threaded extension 32 carrying a lock-nut 35 and received in a threaded opening 33 in the other driving rod section 34. When it is desired to change the location of the starting position for twisting, an end of the driving rod is disengaged, adjustment made through the threaded means, and the lock-nut fastened.

Where it is desired to test the effect of a particular gas or vapor that might be in contact with the fabric when in actual use, such as in treatment of sewage or in storage of industrial materials, the liquid container may be appropriately sealed, as for example against the main support plate 1, to make it gas tight. The appropriate gas may then be introduced into the vapor space above the liquid in the container. As the sample is twisted and the liquid splashed by the motion, the sample will be exposed both to liquid and gas that might be encountered in actual use.

The expression "twist" as applied herein refers to rotating at least one extremity of a fabric strip, relatively long in relation to its width, about its longitudinal axis.

While reference is made herein to "rubber-coated" fabric, which is the material generally preferred for test in accordance with the present invention, it is contemplated that rubber sheet material which is not reinforced by a fabric base may also be tested according to the practice of this invention and with the apparatus of the invention. Moreover the test samples may consist of one or more plies of rubber sheet, fabric-material or rubber-coated fabric.

In testing the sheet material in the apparatus of this invention various defects or failures which appear during and after the testing may be noted upon periodic inspection, such as bubble formation, tears, separation of rubber from fabric, loss or gain in weight, changes in dimension, changes in tensile strength and in rubber-to-fabric or rubber-to-rubber adhesive strength.

The type of failure indicated by the tests serves as an indication as to how the material may be improved to make the material more resistant to that type failure. For example, an early indication of bubbles could signal the entrapment of air. Failure of the bond between fabric and rubber or rubber and rubber could signal that adhesion needs to be improved.

Illustrations of such changes in the character of rubber-coated fabric are given in the following example. This example is given merely for purpose of illustration and it is not intended that the scope of the invention or the manner in which it may be practiced is limited thereby. Unless specified otherwise, parts and percentages are by weight. The testing apparatus used in this example is that shown in the drawings.

EXAMPLE

Aquatic torsion fatigue tests were performed on a number of strips of 3-ply nylon woven fabric, impregnated, and coated with neoprene rubber. Each strip was 1 inch × 10 inches and was given a 180° turn before the second clamp was tightened onto the strip. An additional twist of 360° was imparted to each strip on each alternate oscillation of the apparatus. The twisting was performed on the strips while they were submerged in tap-water at room temperature. The "A" samples as designated in the table below were of 3 plies of 13 oz. basket-woven nylon fabric, impregnated, and coated with neoprene rubber. The "B" samples were made of 3 plies of square tightly woven nylon fabric, impregnated, and coated with neoprene rubber. Samples of each material were cut into strips running with the grain of the rubber and against the grain. The apparatus was run continuously, for 8 hours out of each 24, and each strip inspected at convenient intervals, for bubbles and other defects or failures. The number of bubbles first observed in both surfaces of the strips, and the number of hours at which these first bubbles were observed were noted, as well as the total number of bubbles in each strip surface at the end of the test. The distance between the clamps on each strip was measured initially and at the end of the test. The thickness and weight of each strip were measured at the beginning and at the end of the test. The initial and final adhesion were measured on each strip by determining the number of pounds required to pull the rubber from the fabric, by pulling at a 180° angle at a rate of 2 inches per minute.

The test results are tabulated below. It will be noted that various test results show a superiority of the "B" samples. This superiority indicated by the test apparatus is borne out in actual use in that this fabric in field use is superior in service to the "A" fabric.

AQUATIC TORSION FATIGUE TESTING OF RUBBER-COATED FABRIC

| Sample | Grain | Surface | Number of bubbles | | | | Percent gauge increase | Percent length increase | Percent weight increase | Adhesion 180° pull lbs./in. at 2"/min. | | Loss rubber/fabric adhesion | |
|---|---|---|---|---|---|---|---|---|---|---|---|---|---|
| | | | 1st | Hrs. | Final | Hrs. | | | | Orig. | Final | Lbs. | Percent |
| A | With | Front | 5 | 232 | 35 | 308 | 6.5 | 5.0 | 10.3 | 62 | 44 | 18 | 29 |
| A | do | Back | 1 | 64 | 2 | 308 | | | | 48 | 31 | 17 | 35 |
| A | Against | Front | 5 | 286 | 5 | 308 | 6.0 | 5.9 | 11.3 | 57 | 46 | 11 | 19 |
| A | do | Back | | None | | 308 | | | | 50 | 35 | 15 | 30 |
| B | With | Front | | None | | 308 | 2.7 | 6.1 | 11.0 | 76 | 62 | 14 | 18 |
| B | do | Back | | None | | 308 | | | | 63 | 44 | 19 | 30 |
| B | Against | Front | | None | | 308 | 3.5 | 5.7 | 11.8 | 77 | 58 | 19 | 25 |
| B | do | Back | | None | | 308 | | | | 62 | 44 | 18 | 29 |

While certain features of this invention have been described in detail with respect to various embodiments thereof, it will, of course, be apparent that other modifications may be made within the spirit and scope of this invention, and it is not intended to limit the invention to the exact details shown above except insofar as they are defined in the following claims:

The invention claimed is:

1. Apparatus for testing the properties of sheet-material under conditions simulating the stresses and strains encountered in actual use comprising:
   1. a means for holding and applying twist to one extremity of a relatively long and narrow strip of said material about its longitudinal axis,
   2. a means for holding the strip's other extremity and preventing the turning thereof in the direction of said applied twist, and
   3. a means for subjecting said strip to a fluid medium during the application of said twist, said twist-applying means being driven by a cog wheel engaged and oscillated by a central cog wheel which simultaneously engages and oscillates a number of similar wheels adapted to simultaneously and in a similar manner provide torsional twist to a plurality of strips.

* * * * *